United States Patent [19]

Teeple, Jr. et al.

[11] 4,039,256
[45] Aug. 2, 1977

[54] INTERMITTENT FILM TRANSPORT REGISTRATION STABILIZATION DEVICE

[75] Inventors: Lawrence R. Teeple, Jr., Palo Alto; Andrew K. Magyary, San Mateo; Kenneth N. Severs, San Carlos, all of Calif.

[73] Assignee: Ampex Corporation, Redwood City, Calif.

[21] Appl. No.: 689,633

[22] Filed: May 24, 1976

[51] Int. Cl.² .............................................. G03B 1/00
[52] U.S. Cl. ...................... 352/184; 226/55; 226/95; 226/97; 226/113; 226/155
[58] Field of Search ............ 352/184; 226/2, 4, 55, 226/59, 95, 97, 113, 152, 155, 156

[56] References Cited

U.S. PATENT DOCUMENTS

| | | | |
|---|---|---|---|
| 3,135,159 | 6/1964 | Fabregat | 352/184 |
| 3,494,524 | 2/1970 | Jones | 352/184 |
| 3,600,073 | 8/1971 | Shaw | 352/184 |
| 3,794,415 | 2/1974 | Jones | 352/184 |
| 3,944,349 | 3/1976 | Jones | 352/184 |

Primary Examiner—Monroe H. Hayes
Attorney, Agent, or Firm—George B. Almeida

[57] ABSTRACT

The invention provides a modification of the conventional rolling loop transport system, which enables the system to operate at the relatively high pull-down speeds required to match the 1.3 millisecond vertical blanking times of a video format, thereby allowing use of the improved transport in a video system. The instant transport utilizes two gaps in a rotor set apart at 180°, entrance of the film at a selected shallow angle, a shortened distance from the exposure gate to the film outlet with no decay of the film loop until expulsion, and a secondary pair of fixed registration pins disposed at the point of expulsion of the film at the film outlet which, in conjunction with a vacuum platen extending from the exposure gate to the film outlet, significantly reduces the jitter at the exposure gate, to allow the use of the transport in high density laser or electron beam recorders.

10 Claims, 9 Drawing Figures

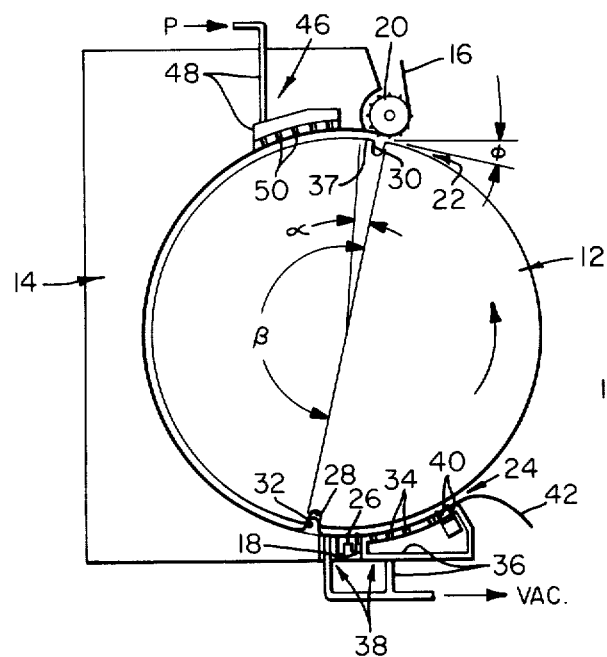
FIG_1
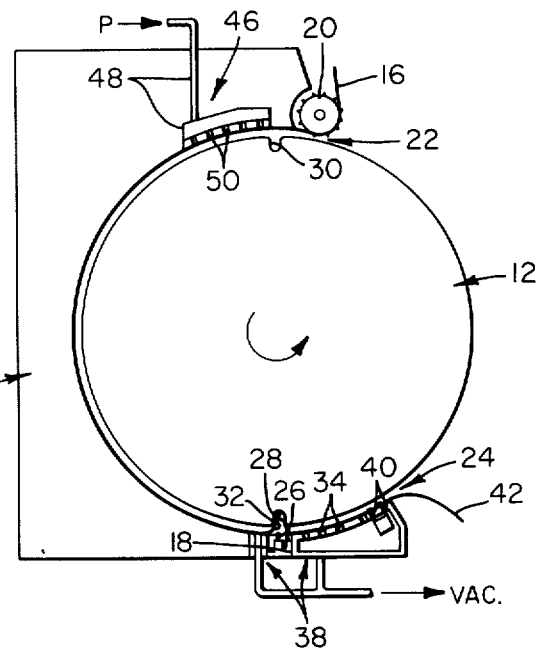
FIG_2
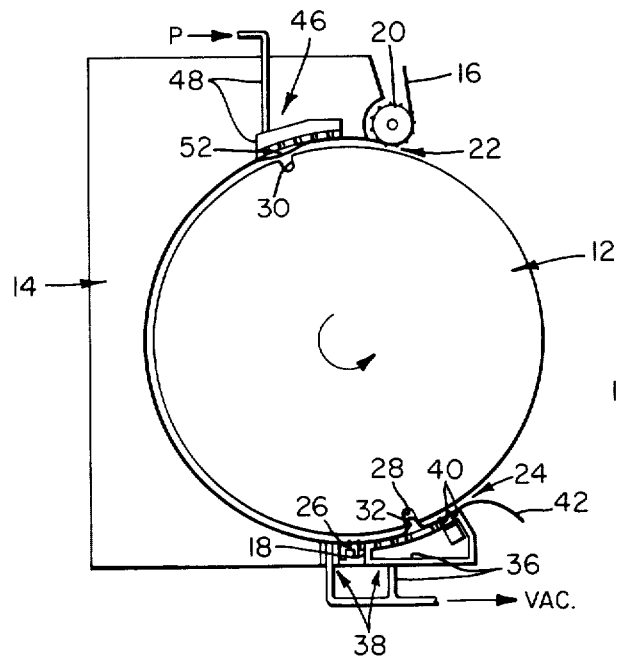
FIG_3
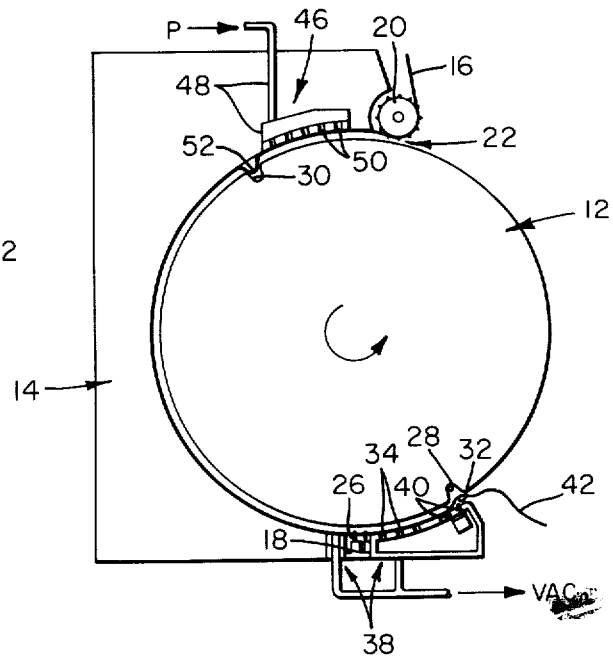
FIG_4

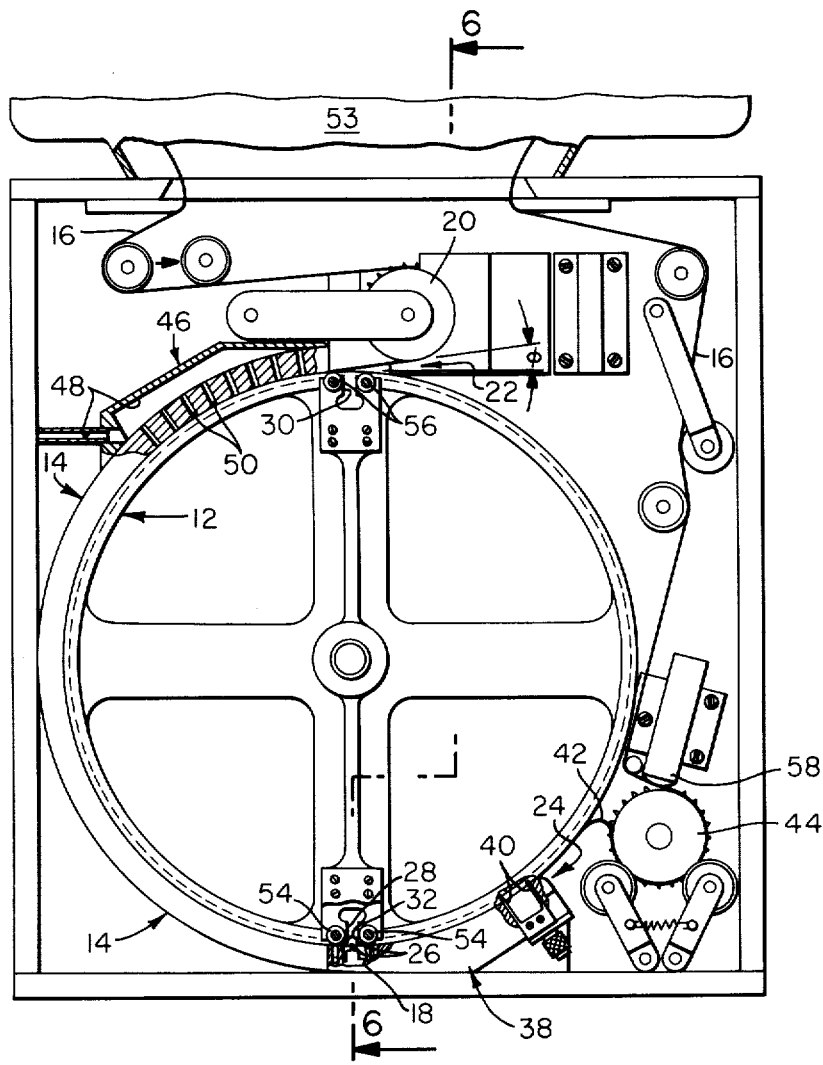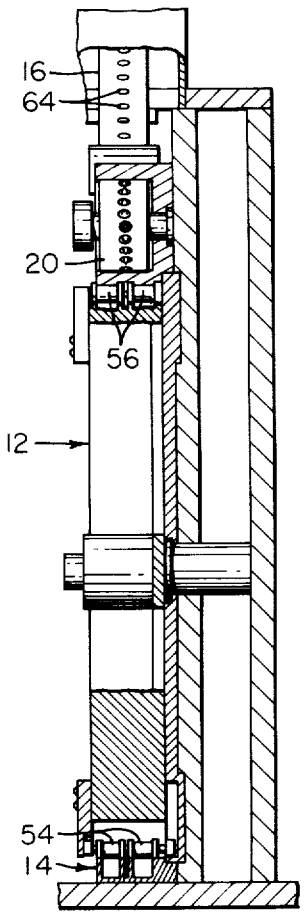
FIG_5    FIG_6

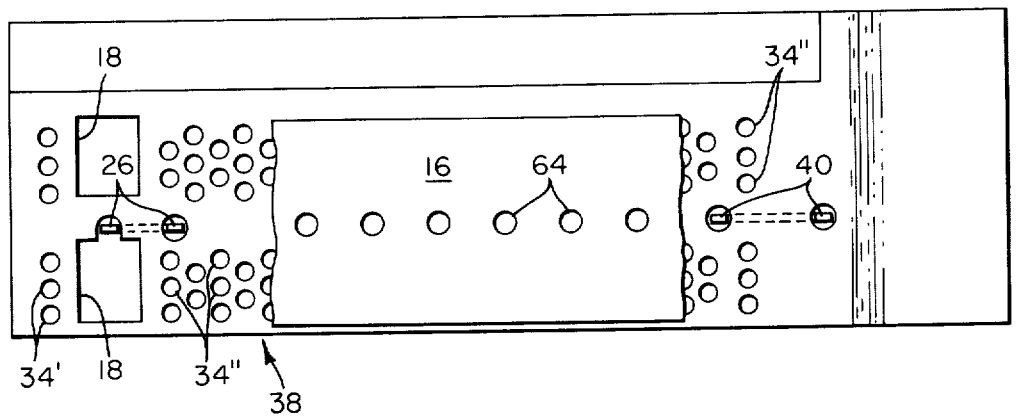
FIG_8
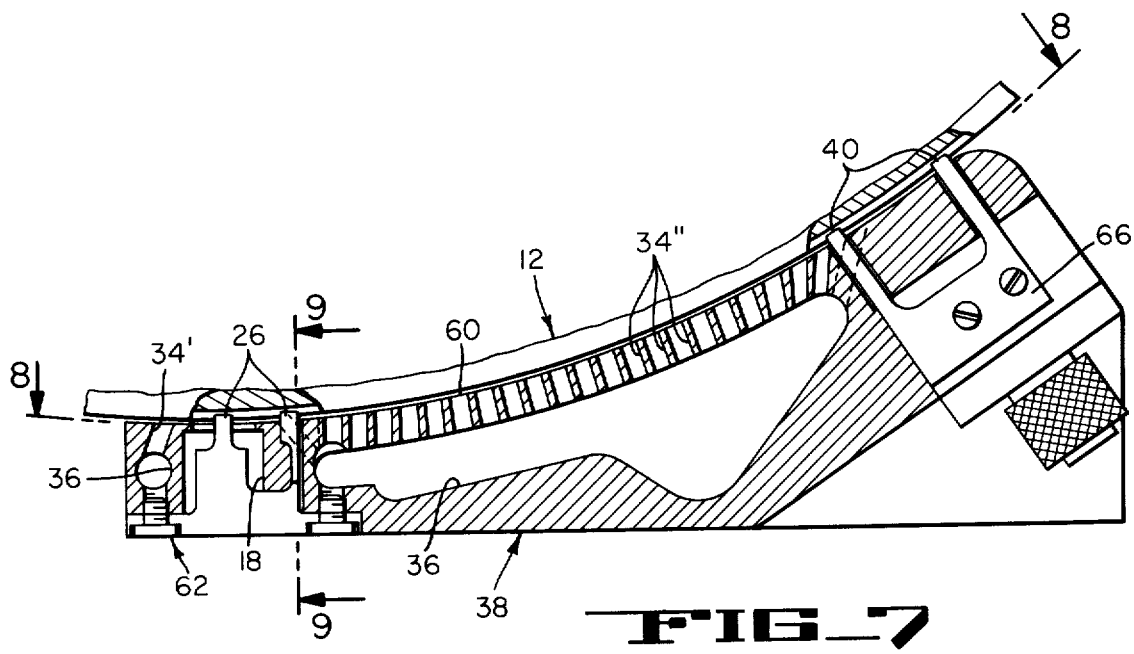
FIG_7
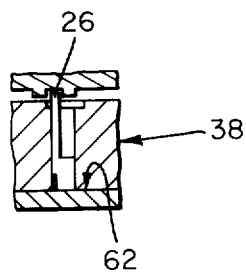
FIG_9

INTERMITTENT FILM TRANSPORT REGISTRATION STABILIZATION DEVICE

The invention herein described was made in the course of a contract with the U.S. Air Force.

BACKGROUND OF THE INVENTION

1. Field

The invention relates to intermittent film transports, and particularly to a rolling loop transport with improvements for reducing the jitter to allow use of the transport in sophisticated video recording systems.

2. Prior Art

The basic concepts of the rolling loop transport may be found, for example, in U.S. Pat. No. 3,494,524, which describes generally a rotating rotor within a stationary stator system, wherein the rotor has a plurality of gaps for forming loops in respective portions of the film being introduced via an inlet sprocket, and removed via an outlet sprocket, both of which are disposed in the stator. U.S. Pat. No. 3,600,073 describes a more sophisticated rolling loop transport utilizing the concepts of the prior patent but including additional features which overcome some of the problems inherent in the more basic transport. The U.S. Pat. No. 3,600,073 utilizes a large plurality of gaps in the rotor, with an associated relatively short distance from the film inlet to the exposure gate wherein the film is exposed, and a prescribed larger distance from the gate to the film outlet. An inlet sprocket and an outlet sprocket are utilized to provide continuous film motion at the inlet and outlet of the transport. Thus, an increasing loop size is generated during the short movement of a rotor gap from the inlet to the exposure gate, while a decaying loop is generated within the rotor gap as it moves the longer distance from the gate to the film outlet. In such rolling loop transports, an unbalance of compressive forces in the film is induced due to the continual change of both the entering (building) and exiting (decaying) loop geometry. As a result, there is generated a rather complex series of longitudinal and transverse forces relative to the film length. Thus the film is elastically deformed in both longitudinal directions about the registration pins located in the region of the exposure gate, wherein the longitudinal deformation direction is dependent upon the circumferential positions of the loops relative to the exposure gate and the registration pins, as the loops travel within the confining stator. Obviously, any elastic deformation and deflection of the film at the registration pins during the exposure of the film (i.e., when performing the recording or reproducing process) causes a corresponding deterioration of the recording, particularly in recording processes utilizing very high density laser or electron beam recording schemes. Thus U.S. Pat. No. 3,600,073 partially overcomes the worst of the bidirectional forces of previous mention by employing a relatively complex arrangement of vacuum and pressure lines, manifolds, stator guides, film guides on the rotor, etc. In addition, the system employs a complex decelerating cam/pin means to slow the film prior to its engagement with the fixed registration pins located in the region of the exposure gate.

The registration pins conventionally utilized in the above-described rolling loop transport systems, serve to position and anchor the film in the exposure gate at the time of exposure thereof. But due to the small bearing area of the film on the pins, large film shafts due to elastic deformation of the film at the perforations thereof in contact with the pins, causes the film to shift in the gate during exposure which contributes to a smeared image and resulting recording deterioration.

U.S. Pat. No. 3,135,159 discloses a modified rolling loop transport which deletes the second or outlet sprocket, wherein the film loop is not decayed during the distance that the rotor moves the loop from the exposure gate to the film outlet. In addition, the latter patent provides a vacuum platen over the entire distance extending from the inlet to the outlet of the film, and thus provides a vacuum platen between the gate and the outlet as means of controlling the movement of the loop while further stabilizing the film. The latter system provides for generation of the rolling loop immediately at the entrance of the system, i.e., provides for the generation of the entire loop size immediately upon introducing the film from the inlet sprocket into the film inlet between the stator and rotor. The inlet area vacuum platen is employed to hold the film motionless while the loop is being formed at the inlet by continuing to feed the film into the system via the inlet sprocket. The subsequent engagement with the single gap of the rotor forces the loop along the vacuum surface to the exposure gate.

The configurations of the above-described rolling loop transports fail to provide adequate pull-down rates and/or sufficient stabilization of the film during the exposure period to allow their use with highly sophisticated video recording schemes utilizing electron and/or laser beam recording techniques.

SUMMARY OF THE INVENTION

The present invention provides a precise combination of features which enables the rolling loop transport to be used for video applications, by providing the required 1.3 millisecond pull-down rate while reducing jitter at the exposure gate to a heretofore unattainable level.

Thus the invention combination reduces the overall shift in forces by expelling the loops shortly after film transfer across the exposure gate. Additional fixed (expulsion) registration pins located at the point of film expulsion, prevent the expulsion reaction from reversing the direction of force on the film within the exposure gate.

To this end, a rotor employing a single pair of gaps spaced apart 180° is disposed within a concentric stator to define therebetween a film passageway. The film is introduced to the passageway via an inlet sprocket at an inlet angle of the order of 15 ½° (e.g., 15 ± 2°). Film shifting, or jitter, is optimized in part by expelling the full size loop shortly after film transfer across the gate is effected and exposure is made. Additional pairs of registration pins are disposed at the point of expulsion, to prevent the generation of the reversed longitudinal force in the film against the registration pins located at the exposure gate. Thus the only longitudinal force exerted on the registration pins at the exposure gate is that force which pushes towards the gate from the film inlet side as the rolling loop is being formed. It follows that the force on the exposure gate registration pins is continuously in one direction, thus deleting reciprocal shifting and attendent jitter of the film in the exposure gate.

Integral with the shortened exit path and expulsion registration pins, is a vacuum platen extending the full width of the film, from a region immediately prior to the exposure gate and extending to the expulsion registration pins at the film outlet. The vacuum platen provides a friction grip on the film to give column constraint to the film at the exposure gate during exposure thereof. This further reduces elastic distortions and movement of the film at the gate due to mechanical forces.

BRIEF DESCRIPTION OF THE DRAWINGS

FIGS. 1, 2, 3 and 4 are simplified plans of the invention combination depicting the invention process of forming and expelling the loops of film with a 1.3 millisecond pull-down rate.

FIG. 5 is a plan of an assembled embodiment of the invention combination.

FIG. 6 is a section taken along section lines 6—6 of FIG. 5.

FIGS. 7 and 8 are an elevation and plan respectively showing in more detail the exposure gate, vacuum platen and expulsion registration pins of the invention stator.

FIG. 9 is a section taken along section lines 9—9 of FIG. 7.

DESCRIPTION OF THE PREFERRED EMBODIMENTS

FIGS. 1-4 illustrate in simplified pictorial views, the consecutive movements of a film, tape, or other like flexible strip in accordance with the invention combination, commensurate with the rotation of a rotor 12 within a film confining passageway formed by a circumjacent concentric stator 14. The apparatus may be utilized in an intermittent transport for a laser or electron beam video recorder, a kinescope camera system, etc. In particular, the transport is herein described, by way of example only, for use in a video laser beam recorder employing a light beam recording film 16, the latter having perforations along the center thereof, and wherein two conventional super-8 millimeter exposures, or tracks, are recorded side-by-side across the film width. It is to be understood that a single super-8, 16 millimeter, etc. recording track could be utilized, wherein the sprocket perforations are located along one, or both, of the outer edge or edges of the film. Exposure of the film is conducted through a pair of openings in the stator, herein termed an exposure gate 18, at such time in the cycle that the time is held in stable registration thereacross, as described further infra. A single inlet, sprocket 20 introduces the film 16 to the film passageway of the transport mechanism via a film inlet 22, and the film leaves the transport via a film outlet 24. A fixed registration pin assembly includes a pair of gate registration pins 26 located in register with the perforations in the film in the region of the exposure gate 18; one at the center of the gate openings and one following at a distance slightly greater than one exposure frame length. Obviously, if a single exposure track is employed in the center of the film, with perforations along one or both film edges, one or two pairs of gate pins located at the same longitudinal position relative to the exposure gate 18 and in register with respective perforations, may be used. The gate pins also may be located immediately prior, as well as after, the gate 18, with corresponding adjustment of the location of the film inlet 22.

In accordance with the invention combination, the rotor 12 includes a pair of rotor gaps 28, 30 herein spaced 180° apart along the circumference of the rotor, each gap extending a length along the circumference which is determined by the condition that the frame lengths plus the gap length is of the order of 7.2° or less. The geometry of the gaps is identical and determined by the desired pull-down time, ergo, the time desired for the loop length to pass by the exposure gate 18. It follows that the length of the fully developed loop is equal to the gap length plus the longitudinal length of one frame of information. Thus, the length (angle α) of a gap plus one frame length (indicated by numeral 37 in FIG. 1) along the circumference of the rotor, is a given ratio of the angle α to the angle β (FIG. 1) commensurate with the pull-down rate.

As depicted in the stepping cycle sequence of FIG. 1, a loop 32 previously formed within gap 28 and now of full size, is approaching the gate registration pins 26. The loop 32 formation was previously initiated upon continued introduction of the film to the transport via the film inlet 22, with subsequent-build up of the loop occuring while the gap 28 rotated towards the exposure gate 18. Build-up occurs since the film 16 is held stationary at the exposure gate 18 via the gate pins 26, while film is continuously being fed at a constant rate into the film inlet 22 via the sprocket.

A vacuum platen 38 extends laterally the full width of the film 16, and longitudinally from a point just prior to the exposure gate 18 to the film outlet 24, generally a total length of the order of a few film widths. Vacuum platen 38 includes apertures 34 facing the film 16 and connected to a vacuum source (not shown) via vacuum manifold/input means 36. A fixed registration pin assembly, including, for example, a pair of expulsion registration pins 40, is located at the film outlet 24 of the vacuum platen 38, and prevents longitudinal forces due to the sudden release of the film loop upon expulsion, from pushing back against the film in the exposure gate region. The pair of pins 40 are herein located at the center of the film 16 in register with the row of perforations therein, and the pins are spaced apart along the longitudinal direction of the film a distance of at least one frame length, and herein shown as two frame lengths. Thus, as the loop is rolled over the expulsion pins 40, at least one pin is always in contact with the film loop until it passes the second, downstream, pin and is totally expelled from the film outlet 24. The expelled film becomes part of a larger loose loop 42, which is then retrieved by a subsequent take-up sprocket (44 of FIG. 5) of the overall system.

It may be seen that the vacuum platen 38 grips the film 16 thereagainst during and after placement of the film on the gate pins 26 by the rotating rotor 12. The resulting column support provides additional stiff opposition to any varying compressive forces imparted by the building of the approaching loop 32, thereby reducing to a minimum any minute jitter of the film in the gate 18. The gate pins 26 alone serve to position and anchor the film in the gate 18, but due to the small bearing area of the film on the pins, large film shifts due to elastic deformation of the film at the perforations cause the film to shift in the gate, contributing to a smeared image. The vacuum platen 38 gives additional column support over the full width of the film, to thus aid the gate pins 26 to retain precise film registration.

Due to the high pull-down speeds required, the beginning of loop formation and the pick-up of the building loop by the respective rotor gap is accomplished herein via a particular arrangement and relationship of the apparatus which introduces the film to the transport. To this end, the inlet sprocket 20 is located at such position relative to the film inlet 22 such that the film 16 is introduced thereto at a given shallow angle $\phi$ of the order of 15° ± 2° relative to a tangent to the rotor circumference. Note that the spacing between the stator 14 and the rotor 12 is exaggerated in FIGS. 1–4 for clarity of description, but is of the order of a film thickness (e.g., 2½ mils) plus 1 mil, as depicted in greater detail in subsequent FIGS. 5, 6. To assure the initial formation of the loop, jets of air are directed inwardly against the film 16 from air jet means 46, which includes pressure manifold/input means 48 and rows of spaced jets 50 located along an inlet portion of the stator. The air jets begin behind the film inlet 22 and extend for a circumferential distance of the order of two or more frame lengths. The combined action of feeding film into the film inlet 22 at the given angle $\phi$, plus the lateral jets of air pressure directed against the film, initiates the formation of the film loop at the desired high rotor speeds. That is, the combined action forces loop formation whenever an excess of film exists, i.e., when the film length is greater than the corresponding length from the rotor gap to the exposure gate 18. The high pull-down rate is accomplished without folding over, pinching or otherwise binding the beginning loop between the stator and rotor. This problem is prevalent in those prior art devices wherein the loop is fully formed at the inlet region prior to being picked up by the rotor gap, particularly when a high speed pull-down rate is attempted.

For video applications, the film is moved at a speed corresponding to the NTSC frame pull-down time of 1.3 milliseconds, which is determined inter alia by the angle $\alpha$ of the gap length plus frame length, and the rotor speed. The rotor 12 herein rotates at a rotational speed of 15 rps, with one revolution providing for the recording of two frames of video. If the frame period is 33 milliseconds, then the effective gap angle $\alpha$ equals 4% of the spacing between gaps, angle $\beta$. It follows that the film loop formation is a gradually increasing process; i.e., the loop cannot be fully formed immediately following its entrance to the film inlet 22, since the necessarily high speed of the rotor would cause the previously mentioned collapse of a fully-formed loop upon contact with an oncoming gap. Thus, in the present combination, the film loop is picked up by its associated gap as it is initially being formed. The loop builds in size as the gap rotates since the film is held stationary by the gate registration pins 26 while it is continuously being fed into the film inlet via the sprocket 20.

FIGS. 2, 3 and 4 show the continuing sequence of operation of the combination transport, wherein in FIG. 2 the rotor 12 has moved through a small angle. The leading part of the fully-formed loop 32 is being rolled over the gate pins 26, whereupon subsequent engagement of the trailing portion of the loop 32 with downstream pin of pins 26 causes re-registration of the film 16 at the exposure gate 18. The film has advanced a distance of one frame, i.e., the length of the loop 32. Since the film 16 is allowed to move in the region of the gate 18 at such time as the loop 32 passes over the pins 26, there is no back force on the film to allow initiation of the next loop. Accordingly, in FIG. 3, (and in the dual gap embodiment) loop formation is initiated diametrically opposed from where the film is re-registered on gate pins 26, ergo, after the second pin thereof. Thus the air jet means 46 is located on the inlet portion of stator 14 in register with the gap 30, at such time as gap 28 is in a position immediately past the gate pins 26. Air is supplied to the jets whereupon continued feeding of film 16 into the transport causes the initiation of a loop 52 within gap 30 since the film 16 again is being held stationary by the gate pins 26. The gap 30 then rolls the loop 52 towards the gate 18 while it increases in size.

Expulsion pins 40 prevent the expulsion of the film 16 from the transport until the loop 32 is rolled by gap 28 past the pins 40, as next shown by that part of the cycle of FIG. 4. As the loop 32 clears the second, or downstream, pin of the pair 40, the backward forces caused by the sudden release of the loop 32 is contained by the first, or upstream, pin of the pair 40. Thus no back longitudinal force is imparted to the film being held by the gate pins 26 across the exposure gate 18. The air jet means stays on until the initial loop formation is sufficient to prevent it from snapping back outwardly against the confining stator. Thereafter, the air jet means 46 is turned off, and loop 52 continues to build up. After further rotation of the rotor 12, the loop 32 is completely expelled to become a part of the large loop 42, and loop 52 approaching the exposure gate 18 is almost fully formed (as depicted for the previous cycle in FIG. 1). Rotor gap 28 is then empty and approaches the film inlet 22, whereat yet another loop will be formed as previously described.

Exposure of the film 16 to record the video information is accomplished by scanning a raster across the film with one, two, four, etc., modulated laser beams via the pair of openings forming the exposure gate 18, during the part of the transport cycle shown in FIGS 3, 4 and back to 1. That is, exposure is started immediately after the loop is rolled over the gate pins 26 and the film stabilizes, and continues until immediately prior to the next loop being rolled over pins 26, as shown in FIG. 1. At this time, the gate pins 26, the expulsion pins 40 and the vacuum platen 38 are co-operating as per the invention combination to prevent any movement, jitter, etc., of the film lying across the gate 18.

Referring to FIGS. 5, 6 there is shown in greater detail the apparatus of the invention combination, including additional sprocket/drive apparatus used to supply and recover the film 16 to and from the rolling loop mechanism. Like components are depicted by the same numerals as used in FIGS. 1–4. Thus film 16 is obtained from a film supply means 53, and is introduced via inlet sprocket 20 to the film inlet 22 formed between the rotor 12 and stator 14. Rotor 12 is shown in the position previously depicted in FIG. 2, wherein the loop 32 is being rolled over the gate registration pins 26 located at the exposure gate 18. Gaps 28, 30 are depicted with low inertia rollers 54, 56 respectively, disposed at the leading and trailing edges thereof, which rotate upon contact with the building loop 32 (and subsequent loop 52) respectively to reduce frictional contact with the film loops. As shown in FIG. 6, the portions of the rollers 54, 56 which are in register with the exposure tracks, are relieved so as not to touch the film in the picture areas. Vacuum platen 38 includes the openings of the exposure gate 18 and the pair of expulsion registrations pins 40. The film outlet 24 is formed by the rotor 12 circumference and the adjacent trailing portion of the vacuum platen 38 in the region of the expulsion 40. The film 16 is expelled intermittently from the transport in the form of the loops, which become part of the loose loop 42. The film is then recovered via the sprocket 44, and is returned to the film supply means 53 by way of a series of idlers, guides, etc. As shown by way of example only, an audio recording/reproduce head means 58 may be disposed along the latter film guiding system to record an audio, control, etc., track of the film 16 as desired.

The air jet means 46 is disposed against the inlet portion of the stator 14 immediately following the film inlet 22, wherein the jets 50 are formed by drilling a series of holes through the stator 14 in register with the manifold portion of the vacuum manifold/input means 48. The input portion thereof comprises a conduit coupled to the manifold. Thus air introduced thereto under pressure is forced via the jets 50 against the film 16 to assure the formation of the loops within the rotor gaps.

FIGS. 7-10 show further details of the vacuum platen 38 portion of the stator 14 depicted in the previous figures. Thus, platen 38 includes the pair of openings defining the exposure gate 18 formed at the leading end of the platen. Vacuum apertures 34' are formed in the platen prior to the exposure gate 18 while vacuum apertures 34'' are formed in the length therein extending from the exposure gate 18 to the expulsion pins 40. All the apertures are coupled to a suitable vacuum source (not shown) via the vacuum manifold/input means 36 of previous mention. The vacuum supplied is of the order of 25 inches of water, and is applied continuously during transport operation.

The gate pins 26 are shown in detail in FIGS. 7, 8, 9 and include a generally flat, one-piece unit, with the points thereof extending radially inward past a film containing surface 60 of the platen 38 a distance sufficient to secure the film 16 but not touch the rotor 12. The pins 26 are rigidly secured to the platen 38 via a base and bolts 62, in register with perforations 64 in the film 16 (FIGS. 6, 8).

Expulsion pins 40 are formed in a single unit which is rigidly secured within the trailing end of the vacuum platen 38 via a base 66. Pins 40 are also centered to protrude sufficiently through holes in the platen to register with the perforations 64 to prevent movement of the film 16 as previously described.

Although a single pair of diametrically opposed gaps 28, 30 are described herein, three or more gaps may be employed keeping in mind the various conditions of rotor speed, ratio of α to β, pull-down rate, etc.

We claim:

1. A film transport for intermittently moving a film past an exposure gate at relatively high pull-down rates commensurate with television systems, the transport including a stator, a rotatable rotor concentric within the stator to define a film passage therebetween, film supply/guide means for supplying and retrieving the film, and means for recording on the film via the exposure gate, comprising the combination of;

a single sprocket disposed to introduce the film from the film supply/guide means to the film passage between the stator and rotor at a selected shallow inlet angle;

said rotor including selected gaps formed in the circumference thereof for gradually forming therein film loops which reach their full size of an exposure frame length upon arriving at the exposure gate;

means for expelling the film loops in their full size condition shortly after their passing the exposure gate;

said means for expelling including expulsion pin means located at the expulsion point of the film loops for preventing back forces upon the film in the exposure gate in response to expulsion of the full size loops; and vacuum means cooperating with the means for expelling the film loops to stabilize the film in the exposure gate during the recording process.

2. The film transport of claim 1 wherein the rotor includes a pair of diametrically opposed gaps, wherein the exposure gate is located approximately diametrically opposed from the point of film introduction, said loops building to full size over the relatively long distance therebetween.

3. The film transport of claim 2 wherein the expulsion point of said means for expelling the film loops is spaced a relatively short distance from the exposure gate, wherein the distance of loop expulsion after exposure is relatively short compared to the distance of gradual loop build-up.

4. The film transport of claim 3 wherein the shallow angle of film introduction to the film passage is of the order of 15° ± 2°.

5. The film transport of claim 4 wherein the ratio of the sum of the gap length plus frame length to the spacing between gaps in the rotor is of the order of 4% and less of the angular rotor gap spacing.

6. The film transport of claim 4 including air jet means integral with the stator in the region of film introduction for directing air radially inwardly against the film immediately after introduction thereof to the film passage to enhance the initiation of the loops.

7. The film transport of claim 4 wherein recording is conducted during the period beginning after a loop passes the exposure gate and ending just prior to the next loop arriving at the exposure gate.

8. The film transport of claim 7 wherein the means for expelling further includes a length of stator integral with the vacuum means, the latter means including a vacuum platen starting just prior to the exposure gate and extending to the expulsion pin means and the point of film expulsion, said exposure gate defining an opening in the vacuum platen through which recording is conducted.

9. The film transport of claim 8 wherein the expulsion pin means includes two fixed registration pins spaced apart at least one exposure frame length of film.

10. The film transport of claim 9 wherein the rotor rotational speed provides for passage of the gaps therein past the exposure gate at the video frame rate, said gap lengths being commensurate therewith to provide a pull-down rate commensurate with the video vertical blanking times.

* * * * *